United States Patent
Kanayama et al.

(10) Patent No.: US 6,655,842 B2
(45) Date of Patent: Dec. 2, 2003

(54) PLAIN BEARING

(75) Inventors: Hiroshi Kanayama, Aichi (JP); Toru Desaki, Aichi (JP); Kimio Kawagoe, Aichi (JP); Yasuaki Goto, Aichi (JP); Yoshio Fuwa, Aichi (JP); Hirofumi Michioka, Aichi (JP); Kenyuu Akiyama, Aichi (JP)

(73) Assignee: Taiho Kogyo Co., Ltd., Aichi (JP)

(*) Notice: Subject to any disclaimer, the term of this patent is extended or adjusted under 35 U.S.C. 154(b) by 32 days.

(21) Appl. No.: 10/110,538

(22) PCT Filed: Aug. 13, 2001

(86) PCT No.: PCT/JP01/06987

§ 371 (c)(1),
(2), (4) Date: Apr. 15, 2002

(87) PCT Pub. No.: WO02/14703

PCT Pub. Date: Feb. 21, 2002

(65) Prior Publication Data

US 2003/0031389 A1 Feb. 13, 2003

(30) Foreign Application Priority Data

Aug. 15, 2000 (JP) .................................. P2000-246354

(51) Int. Cl.$^7$ .......................... F16C 3/06; F16C 33/20
(52) U.S. Cl. ................ 384/276; 384/294; 384/297; 384/909
(58) Field of Search ...................... 384/276, 294, 384/297, 299, 300, 908, 909

(56) References Cited

U.S. PATENT DOCUMENTS 3,955,856 A * 5/1976 Wayson et al. ............. 384/297
5,506,056 A * 4/1996 Yoshihara ................... 384/908

FOREIGN PATENT DOCUMENTS

| GB | 2337306 A | 11/1999 |
| JP | 4-83914 | 3/1992 |
| JP | 7-247493 | 9/1995 |
| JP | 11-106779 A | 4/1999 |
| JP | 2000-283143 A | 10/2000 |

* cited by examiner

Primary Examiner—Thomas R. Hannon
(74) Attorney, Agent, or Firm—Sughrue Mion, PLLC

(57) ABSTRACT

An object of the present invention is to provide a sliding bearing having an excellent initial conformability and seizure resistance as well as desired durability and heat resistance required particularly for high speed engine.

The present invention provides a sliding bearing having a resin coating layer comprising a thermosetting resin being soft and having a good elongation at high temperature and a solid lubricant formed on a bearing alloy layer.

3 Claims, 1 Drawing Sheet

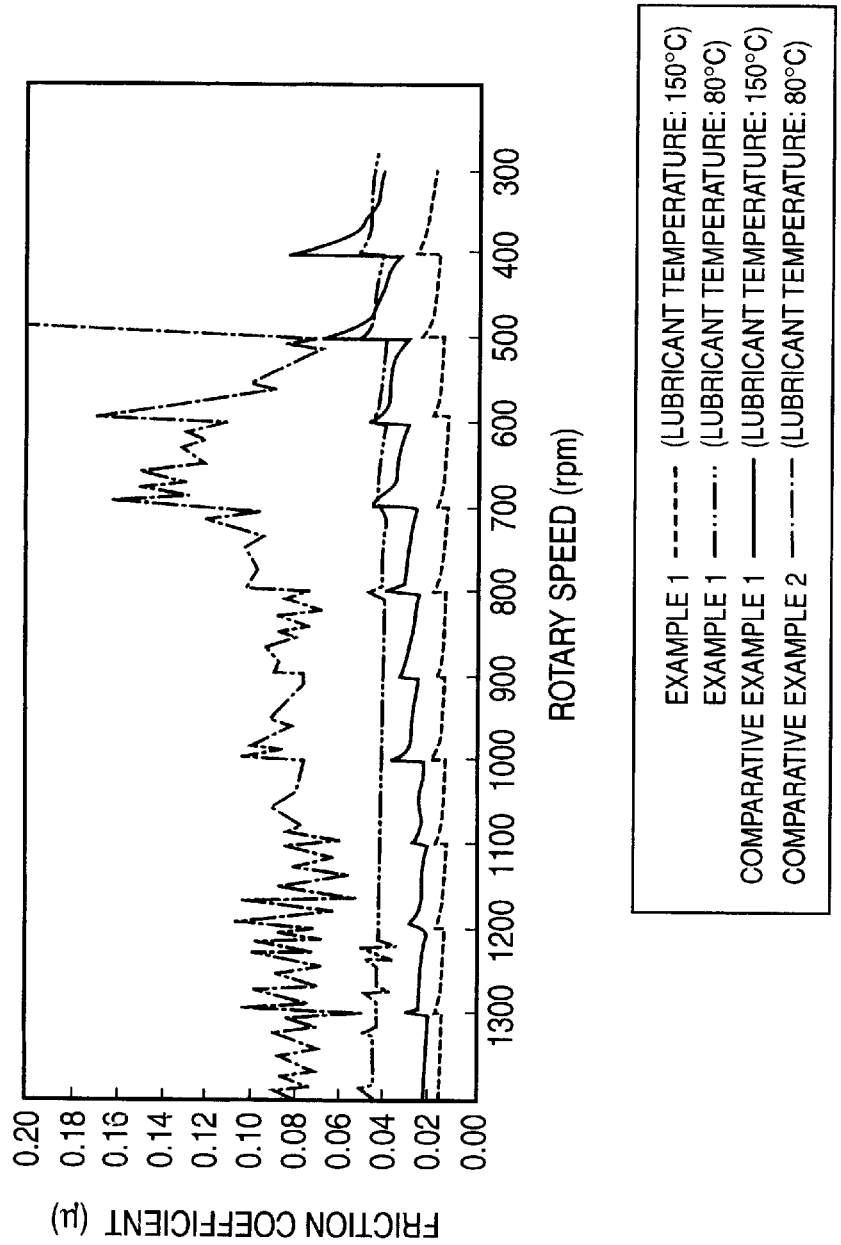

PLAIN BEARING

TECHNICAL FIELD

The present invention relates to a sliding bearing which can be used in engine for automobile and other industrial machines.

BACKGROUND OF THE INVENTION

A sliding bearing for automobile engine is normally made of aluminum alloy or Cu—Pb alloy overlaid by Pb-based material. In recent years, automobile engines having a remarkably enhanced performance such as higher output and higher rotary speed have been developed. Thus, the excellent appearance of a sliding bearing in sliding properties, particularly initial conformability and seizure resistance, as well as in durability and heat resistance has been desired.

JP-A-04-83914 discloses a sliding bearing material having a coating layer comprising a solid lubricant of 55 to 95% by weight and a polyimide-based binder of 10 to 45% by weight, and formed on the surface of an aluminum alloy bearing. Such a solid lubricant layer makes it possible to improve the initial conformability of the aluminum alloy bearing and hence attain an excellent fatigue resistance and seizure resistance. The above mentioned publication discloses that the abrasion resistance of the solid lubricant layer can be improved due to the replacement of the solid lubricant of 1 to 20% by weight by a friction adjustor.

Further, JP-A-07-247493 discloses an incorporation of a film-forming coadjuvant in a solid lubricant layer comprising a solid lubricant of 70 to 97% by weight and a binder (polyimide resin, epoxy resin, phenolic resin) of 3 to 30% by weight. The incorporation makes the solid lubricant be firmly retained on the bearing alloy, provides a good initial conformability and hence an excellent seizure resistance and prevents exfoliation of the solid lubricant layer to give a good abrasion resistance.

However, since the foregoing solid lubricant layer in the related art has an additional amount of a solid lubricant of 55 to 97% or more by weight, an internal strength of coating layer and retention of solid lubricant are insufficient. Accordingly, the conformability deteriorates and seizure or the like occurres due to the exfoliation of the film or other defects cause.

DISCLOSURE OF THE INVENTION

An object of the present invention is to provide a sliding bearing having an excellent initial conformability and seizure resistance as well as desired durability and heat resistance required particularly for high speed engine.

In accordance with the present invention, a sliding bearing having the following constitution can be provided to accomplish the foregoing object of the present invention.

1. A sliding bearing comprising a resin coating layer formed on a bearing alloy layer, wherein that the resin coating layer comprises: a thermosetting resin being soft and having a good elongation at high temperature which exhibits a tensile strength of from 70 to 110 MPa and an elongation of from 7 to 20% at 25° C. and a tensile strength of not lower than 15 MPa and an elongation of not lower than 20% at 200° C. in an amount of from 70 to 30 vol-%; and a solid lubricant in an amount of from 30 to 70 vol-%, and wherein a bipartite total of the soft thermosetting resin and the solid lubricant becomes 100 vol-%, and a Vickers hardness Hv of the resin coating layer is not greater than 20.

2. The sliding bearing as set forth in above 1., wherein the thermosetting resin is a polyamideimide resin.

3. The sliding bearing as set forth in above 1. or 2., which is used for an internal combustion engine.

In order to improve the initial conformability and the seizure resistance at a high speed, it is necessary to secure a desired thickness of a fluid film by an abrasion or a deformation of the resin coating layer, when the thickness of the lubricant film becomes thin locally or a solid contact comes close to occur.

Heretofore, this demand is coped with by increasing the amount of the solid lubricant. However, when the amount of the solid lubricant is increased too much, the resin coating layer becomes brittle, the exfoliation of the solid lubricant or other defects cause the sliding bearing to undergo easily seizure and thus the a resin coating layer have a deteriorated initial conformability.

Under these circumstances, the inventors have noticed the resin binding the solid lubricant. By using as such a resin a soft thermosetting resin which exhibits a good elongation at high temperature, a sliding bearing having a solid lubricant resin coating layer having a good initial conformability and seizure resistance as well as a good heat resistance and durability was developed. The present invention has thus been worked out.

BRIEF DESCRIPTION OF THE DRAWINGS

FIG. 1 is a graph illustrating the measurements of the change of friction coefficient of the sliding bearings prepared in Example 1 and Comparative Examples 1 and 2 during the gradual reduction of rotary speed.

BEST MODE FOR CARRYING OUT THE INVENTION

The sliding bearing of the present invention will be further described hereinafter.

The sliding bearing of the present invention is a sliding bearing having a resin coating layer formed on a bearing alloy layer. The resin coating layer comprises a soft thermosetting resin having a good elongation at high temperature and a solid lubricant.

The thermosetting resin to be used in the resin coating layer on the sliding bearing is a soft thermosetting resin having a good elongation at high temperature. In some detail, a thermosetting resin having a tensile strength of from 70 to 110 MPa, preferably from 80 to 100 MPa, and an elongation of from 7 to 20%, preferably from 7 to 15%, at 25° C. is preferred. An even more desirable thermosetting resin is a thermosetting resin which meets the foregoing requirements and having a tensile strength of not smaller than 15 MPa, preferably from 15 to 50 MPa, and an elongation of not smaller than 20%, at 200° C., and such a thermosetting resin is a typical example of the soft thermosetting resin having a good elongation at high temperature.

The preferred thermosetting resin employable herein is not specifically limited so far as it satisfies the foregoing requirements. Specific examples of thermosetting resin include polyimide resin, polyamideimide resin, diisocyanate-modification thereof, BPDA-modification thereof and sulfone-modification products thereof, epoxy resin, phenolic resin, etc. Preferred among these resins is polyamideimide resin.

The polyamideimide resin satisfying the foregoing requirements for tensile strength and elongation can be obtained by arranging such that the number-average molecular weight of an uncured resin is not lower than 20,000 to reduce the number of terminal crosslinking sites and adding a polymer containing an epoxy group to the resin to expedite curing.

The foregoing tensile strength and elongation of the foregoing thermosetting resin are measured according to ASTM D-1708.

Examples of the solid lubricant include molybdenum disulfide ($MoS_2$), graphite, BN (boron nitride), tungsten disulfide ($WS_2$), PTFE (polytetrafluoroethylene), fluororesin, Pb, etc. These solid lubricants may be used singly or in combination of two or more thereof.

The graphite may be employed either natural or artificial, but artificial graphite is desirable from the standpoint of abrasion resistance.

These solid lubricants act to reduce the friction coefficient and stabilize the resin coating layer and exhibit conformability. In order to fully attain these actions, the average particle diameter of the solid lubricant is preferably not greater than 15 $\mu$m, particularly from 0.2 to 10 $\mu$m.

Particularly preferred among the foregoing solid lubricants are molybdenum disulfide, graphite, boron nitride, and tungsten disulfide.

The resin coating layer on the sliding bearing of the present invention comprises a thermosetting resin of 30 to 70 vol %, preferably from 50 to 70 vol %, and a solid lubricant of 30 to 70 vol %, preferably from 30 to 50 vol-%, respectively (totaling 100 vol-%).

In accordance with this mixing proportion, the solid lubricant can be firmly retained in the resin coating layer comprising a soft thermosetting resin having a good elongation at high temperature to provide a sufficient seizure resistance and initial conformability as well as a sufficient durability and heat resistance.

The resin coating layer on the sliding bearing of the invention preferably comprises a friction adjustor and/or extreme-pressure additive incorporated therein.

Examples of the extreme-pressure additive employable herein include sulfur-containing metal compounds such as ZnS, $Ag_2S$, CuS, FeS, $FeS_2$, $Sb_3S_2$, PbS, $Bi_2S_3$ and CdS, sulfur-containing compounds such as thiraum, morpholine disulfide, dithionate, sulfide, sulfoxide, sulfonate, thiophosphinate, thiocarbonate, dithiocarbonate, alkylthiocarbamoyl and olefin sulfide, halogen compounds such as chlorinated hydrocarbon, thiophosphates such as zinc dithiophoate, organic metal compounds such as thiocarbaminate, and organic molybdenum compounds such as molybdenum dithiophosphate and molybdenum dithiocarbimate.

The average particle diameter of the extreme-pressure additive is preferably not greater than 5 $\mu$m, more preferably not greater than 2 $\mu$m. In the case where the extreme-pressure additive is added, it is preferred that the foregoing solid lubricant be replaced by the extreme-pressure additive of 0.5 to 10 vol-%, particularly from 1 to 5 vol-% out of the solid lubricant of 30 to 70 vol-%.

The addition of the extreme-pressure additive makes it possible to provide a sufficient abrasion resistance or seizure resistance particularly even under insufficient lubricating conditions causing temporary solid contact or one side contact. This mechanism of action is unknown, but it is presumed that the extreme-pressure additive dispersed in the resin coating layer effectively acts under conditions that frictional heat or shearing stress caused by temporary solid contact can cause the breakage of the resin coating layer. In other words, it is presumed that the solid lubricant and the extreme-pressure additive contained in the film thereof cause the lubricating oil to be firmly retained on the bearing and make it difficult for the border lubricant film to destroy, giving a smooth sliding surface that maintains desired seizure resistance and abrasion resistance.

Examples of the friction adjustor include oxides such as $CrO_2$, $Fe_3O_4$, PbO, ZnO, CdO, $Al_2O_3$, $SiO_2$ and $SnO_2$, and compounds such as SiC and $Si_3N_4$. In the case where the friction adjustor is added, it is preferred that the foregoing solid lubricant be replaced by the friction adjustor of 0.3 to 10 vol-%, particularly from 0.5 to 5 vol-% out of the solid lubricant of 30 to 70 vol-%. The incorporation of the friction adjustor makes it possible to improve the abrasion resistance. In particular, when the friction adjustor is used in combination with the extreme-pressure additive, the improvement of abrasion resistance by the friction adjustor and the maintenance of the lubricating oil by the extreme-pressure additive act synergistically to give a drastic enhancement of abrasion resistance.

The friction adjustor and the extreme-pressure additive may be used in combination. In this case, the sum of the added amount of the two ingredients is preferably from 0.3 to 10 vol-%, particularly from 0.5 to 5 vol-%, out of the foregoing solid lubricant of 30 to 70 vol-%.

In the present invention, in order to form the resin coating layer, a coating solution having the foregoing ingredients dissolved or dispersed therein is prepared. During this procedure, a proper amount of an organic solvent (diluent) may be used. The organic solvent is intended to adjust the viscosity of the coating solution and hence facilitate mixing. Any organic solvent capable of dissolving the thermosetting resin used therein may be used without any restriction. For example, if the thermosetting resin is a polyamideimide resin, xylene, N-methyl-2-pyrrolidone, toluene or the like may be used in an amount of 100 to 300 parts by mass based on 100 parts by mass of the total amount of the foregoing ingredients.

In the present invention, a coating solution containing the foregoing thermosetting resin and solid lubricant, and optionally the friction adjustor and/or extreme-pressure additive is applied to the surface of a bearing alloy layer to form a coating layer (resin coating layer), making it possible to obtain a sliding bearing excellent in sliding properties such as initial conformability, seizure resistance and abrasion resistance.

The Vickers hardness Hv of the resin coating layer is preferably not higher than 20, more preferably from 5 to 17 (as measured by a Type MVK-1 ultralight load microhardness tester produced by Akashi Seisakujo Co., Ltd. at a load of 5 g). By thus reducing the hardness of the resin coating layer, when a load is suddenly applied to the sliding bearing to cause a local solid contact, the site of local solid contact undergoes local abrasion to prevent solid contact and hence secure desired thickness of lubricating oil layer, improving the initial conformability and seizure resistance. When the Vickers hardness Hv of the resin coating layer exceeds 20, the resin coating layer can difficultly undergo local abrasion or deformation, causing solid contact resulting in sudden destruction of coating layer leading to seizure to disadvantage.

Examples of the bearing alloy to be used as bearing substrate include copper alloy, aluminum alloy, etc.

The formulation of the bearing alloy is not specifically limited. However, as the aluminum alloy there is preferably used an aluminum alloy containing Cr, Si, Mn, Sb, Sr, Fe, Ni, Mo, Ti, W, Zr, V, Cu, Mg, Zn or the like, preferably in an amount of not greater than 10% by mass and one or more of Sn, Pb, In, Tl and Bi preferably in an amount of not greater than 20% by mass, respectively. The former group of elements mainly provide strength and abrasion resistance while the latter group of elements mainly provide conformability. The former and latter groups of elements are preferably used in combination.

The process for the formation of the resin coating layer on the bearing alloy layer will be further described hereinafter.

A bearing alloy such as copper alloy and aluminum alloy is worked into a sliding bearing-shaped lining which is degreased in an alkaline treatment such as caustic soda, and then washed with cold or hot water to remove the alkali therefrom. For example, when it is necessary that the adhesion of the coating layer be raised, a process may be employed, e.g., process involving roughening of the surface of the lining by a chemical treatment such as combination of alkali etching and washing with acid after degreasing, process involving roughening of the surface of the lining by a mechanical treatment such as shot blasting, process involving the formation of unevenness on the surface of the lining by boring or the like. When it is necessary that the adhesion of the coating layer be raised, the surface of the lining may be subjected to chemical formation with zinc phosphate or zinc calcium phosphate to a thickness of from 0.1 to 5 $\mu$m. When a base treatment such as boring and a chemical formation are effected in combination, a resin coating layer having an extremely high adhesion can be obtained.

The lining thus washed with hot water is then dried with hot air. The coating solution which has been diluted with a proper diluent is applied to the lining through a spray, and then dried and sintered at a temperature of from 150° C. to 300° C. When the surface roughness of the lining having a coating layer formed thereon is high, the lining is then subjected to smoothing such as buffing. Instead of spraying, a method such as roll transfer, tumbling, dipping, brush coating and printing may be employed to form a resin coating layer. The thickness of the resin coating layer is preferably from 1 $\mu$m to 50 $\mu$m.

In the case where coating is made on an aluminum alloy bearing or the like, when the curing temperature is raised to not lower than 200° C., it is likely that sweating of the aluminum alloy bearing with Sn contained therein can deteriorate the bearing performance. In this case, a thermosetting resin which exhibits the highest tensile strength and elongation at a curing temperature of not higher than 200° C. is preferably used.

EXAMPLE

The present invention will be further described in the following examples, but the present invention should not be construed as being limited thereto.

Example 1

Comparative Examples 1 and 2

60 vol-% of a polyamideimide resin A (produced by Hitachi Chemical Co., Ltd.) set forth in Table 1, 40 vol-% of molybdenum disulfide as a solid lubricant and a proper amount of an organic solvent (N-methyl-2-pyrrolidone) were charged in a ball mill where they were then ground in admixture for 3 hours to prepare a coating solution for forming a resin coating layer.

Subsequently, the surface of a bearing having a semicylindrical form or the like having a lining material made of aluminum alloy (Al-11Sn-1.8Pb-1Cu-3Si) contact-bonded to the backing steel plate was degreased, and then shot-blasted to have a roughness Rz of 1 $\mu$m. Subsequently, the foregoing coating solution was air-sprayed onto the bearing to a thickness of about 6 $\mu$m, and then heat-cured at 180° C. for about 60 minutes to form a resin coating layer thereon. Thus, a sliding bearing (overlay for metal) was produced (Example 1).

On the other hand, resin coating layers were formed to produce sliding bearings in the same manner as in Example 1 except that comparative coating solutions were prepared from a polyamideimide resin B (produced by Hitachi Chemical Co., Ltd.) (Comparative Example 1) and a polyamideimide resin C (produced by Hitachi Chemical Co., Ltd.) (Comparative Example 2), respectively, as a polyamideimide resin.

Examples from 2 to 5

Comparative Examples 3 and 4

Resin coating layers were formed to produce sliding bearings in the same manner as Example 1 except that the kind and amount of polyamideimide resin (PAI) to be used, the amount of molybdenum disulfide ($MoS_2$), and optionally the amount of zinc sulfide (ZnS) as an extreme-pressure additive and aluminum oxide ($Al_2O_3$) as a friction adjustor were change as set forth in Table 2.

In order to evaluate the performance of the various bearings thus obtained, these bearings were then measured for Vickers hardness of the resin coating layer and subjected to seizure resistance test and abrasion resistance test. The results are set forth in Table 2. The measurements of the change of friction coefficient of the sliding bearings produced in Example 1 and Comparative Examples 1 and 2 with the gradual decrease of rotary speed are shown in FIG. 1.

The various tests were effected in the following manner.

Seizure resistance test: The number of rotations at which seizure occurs when the sliding bearing is operated with a lubricant 5W-30SJ at a rotary load of 29 MPa and a lubricant temperature of 150° C. with a gradual speed rise of 500 rpm/30 minutes was determined.

Abrasion resistance test: The bearing was measured for abrasion after 5 hours of operation with a lubricant 10W-30CD at a lubricant temperature of 100° C., a load of 30 MPa and a rotary speed 3,000 rpm.

Change of friction coefficient with gradual decrease of rotary speed: The measurement was conducted with a lubricant 5W-30SH, a load of 20 MPa and a lubricant temperature of 80° C. and 150° C. with a gradual speed decrease from 1,300 rpm to 100 rpm during 600 seconds. The measurement of the sliding bearing produced in Example 1 was conducted at a lubricant temperature of 80° C. and 150° C., the measurement of the sliding bearing produced in Comparative Example 1 was conducted at a lubricant temperature of 150° C., and the measurement of the sliding bearing produced in Comparative Example 2 was conducted at a lubricant temperature of 80° C.

TABLE 1

|  | Kind of PAI | | |
|---|---|---|---|
|  | A | B | C |
| Tensile strength (MPa) | | | |
| 25° C. | 95 | 98 | 125 |
| 200° C. | 22 | 45 | 30 |
| Elongation (%) | | | |
| 25° C. | 9 | 15 | 9 |
| 200° C. | 31 | 15 | 15 |

TABLE 2

| | Formulation | | | | Vickers hardness Hv of coating layer | Seizure resistance (rpm) | Abrasion resistance (μm) |
|---|---|---|---|---|---|---|---|
| | PAI Kind | MoS₂ vol-% | ZnS vol-% | Al₂O₃ vol-% | | | |
| Example | | | | | | | |
| 1 | A | 60 | 40 | — | — | 14 | 8,000 | 3 |
| 2 | A | 44 | 56 | — | — | 10 | 8,000 | 5 |
| 3 | A | 60 | 37 | 3 | — | 14 | 8,000 | 2 |
| 4 | A | 60 | 37 | — | 3 | 15 | 8,000 | 2 |
| 5 | A | 60 | 37 | 1.5 | 1.5 | 14 | 8,000 | 2 |
| Comparative Example | | | | | | | |
| 1 | B | 60 | 40 | — | — | 29 | 7,500 | 6 |
| 2 | C | 60 | 40 | — | — | 35 | 6,500 | 2 |
| 3 | B | 60 | 37 | 3 | — | 29 | 7,500 | 4 |
| 4 | C | 60 | 37 | 3 | — | 35 | 6,000 | 2 |

As can be seen in the results of Table 2, the sliding bearings of the examples are excellent in seizure resistance and abrasion resistance.

On the contrary, it is obvious that the sliding bearings of the comparative examples, the resin coating layer of which comprises a polyamideimide resin having a poor softness and a small elongation at high temperature, exhibit a deteriorated seizure resistance.

The change of friction coefficient with a gradual decrease of rotary speed shown in FIG. 1 demonstrates that the sliding bearing of Example 1 exhibits a low and stable friction coefficient and hence an excellent initial conformability. It is also made obvious that the sliding bearings of Comparative Examples 1 and 2 exhibit a high friction coefficient and a great change of friction coefficient and hence a deteriorated initial conformability.

While the present invention has been described in detail and with reference to specific embodiments, various changes and modifications can be made therein without departing from the spirit and scope thereof.

The present application is based on Japanese Patent Application No. 2000-246354 filed on Aug. 15, 2000, the contents of which are incorporated herein as reference.

Industiral Applicability

The sliding bearing of the present invention is excellent in initial conformability and seizure resistance as well as in seizure resistance, durability and heat resistance and thus can be preferably used as a sliding bearing particularly for engine for automobile or other industrial machines.

What is claimed is:

1. A sliding bearing comprising a resin coating layer formed on a bearing alloy layer, wherein that the resin coating layer comprises:

a thermosetting resin being soft and having a good elongation at high temperature which exhibits a tensile strength of from 70 to 110 MPa and an elongation of from 7 to 20% at 25° C. and a tensile strength of not lower than 15 MPa and an elongation of not lower than 20% at 200° C. in an amount of from 70 to 30 vol-%; and a solid lubricant in an amount of from 30 to 70 vol-%, and wherein a bipartite total of the soft thermosetting resin and the solid lubricant becomes 100 vol-%, and a Vickers hardness Hv of the resin coating layer is not greater than 20.

2. The sliding bearing as set forth in claim 1, wherein the thermosetting resin is a polyamideimide resin.

3. The sliding bearing as set forth in claim 1 or 2, which is used for an internal combustion engine.

* * * * *